United States Patent
Darling et al.

(10) Patent No.: US 10,624,719 B2
(45) Date of Patent: Apr. 21, 2020

(54) COVER FOR BRACKET OF ORTHODONTIC APPLIANCE

(71) Applicants: Steven Darling, Ocean Ridge, FL (US); Janis Darling, Ocean Ridge, FL (US)

(72) Inventors: Steven Darling, Ocean Ridge, FL (US); Janis Darling, Ocean Ridge, FL (US)

(*) Notice: Subject to any disclaimer, the term of this patent is extended or adjusted under 35 U.S.C. 154(b) by 32 days.

(21) Appl. No.: 15/991,509

(22) Filed: May 29, 2018

(65) Prior Publication Data

US 2018/0360568 A1    Dec. 20, 2018

Related U.S. Application Data

(60) Provisional application No. 62/512,922, filed on May 31, 2017.

(51) Int. Cl.
*A61C 3/00* (2006.01)
*A61C 7/12* (2006.01)
*A61C 7/28* (2006.01)
*A61C 19/10* (2006.01)

(52) U.S. Cl.
CPC ............... *A61C 7/125* (2013.01); *A61C 7/28* (2013.01); *A61C 19/10* (2013.01); *A61C 2201/002* (2013.01)

(58) Field of Classification Search
CPC ........... A61C 7/125; A61C 7/28; A61C 19/10; A61C 2201/002; A61C 7/30; A61C 7/303
See application file for complete search history.

(56) References Cited

U.S. PATENT DOCUMENTS

| | | | | |
|---|---|---|---|---|
| 4,355,975 A | * | 10/1982 | Fujita | A61C 7/30 433/11 |
| 4,551,094 A | * | 11/1985 | Kesling | A61C 7/30 433/17 |
| 4,712,999 A | * | 12/1987 | Rosenberg | A61C 7/285 433/11 |
| 4,913,654 A | * | 4/1990 | Morgan | A61C 7/125 433/11 |
| 5,474,444 A | * | 12/1995 | Wildman | A61C 7/12 433/18 |
| 5,857,849 A | * | 1/1999 | Kurz | A61C 7/285 433/10 |
| 5,967,773 A | * | 10/1999 | Roman | A61C 7/30 433/11 |
| 6,347,939 B2 | | 2/2002 | Abels | |

(Continued)

*Primary Examiner* — Nicholas D Lucchesi
(74) *Attorney, Agent, or Firm* — Robert M. Downey, P.A.

(57) ABSTRACT

A cover device formed of a plastic or similar composition is structured for removable attachment over a bracket of an orthodontic appliance and includes a main plate with an outer front face, and top and bottom claws integrally formed with the main plate, curling behind the main plate, and each terminating at distal ends in spaced, opposing relation to each other behind the main plate. The main plate is bowed outwardly from top to bottom to allow the claws to flex away from each other and snap over the bracket upon application of inward pressure on the front face while the claws are pressed against the bracket, to thereby attach the cover to the bracket, with the bracket concealed from view behind the cover device. The front face may include an ornamental design. In another embodiment, the cover device includes a bottom tab for cooperating engagement with a removal tool.

16 Claims, 13 Drawing Sheets

(56) References Cited

U.S. PATENT DOCUMENTS

| | | | | |
|---|---|---|---|---|
| 6,655,957 | B2* | 12/2003 | Abels | A61C 7/125 433/10 |
| 7,134,872 | B2* | 11/2006 | Abels | A61C 7/14 433/8 |
| 7,204,691 | B2* | 4/2007 | Darling | A61C 7/303 433/11 |
| 7,234,935 | B2* | 6/2007 | Abels | A61C 7/285 433/10 |
| 7,611,352 | B2* | 11/2009 | Abels | A61C 7/125 433/10 |
| 9,844,422 | B1* | 12/2017 | Wu | A61C 7/125 |
| 10,265,142 | B2* | 4/2019 | Von Mandach | A61C 7/141 |
| 2006/0257808 | A1* | 11/2006 | Feller | A61C 7/00 433/2 |
| 2007/0099145 | A1 | 5/2007 | Abels et al. | |
| 2010/0081106 | A1* | 4/2010 | Park | A61C 7/12 433/8 |
| 2010/0129765 | A1* | 5/2010 | Mohr | A61C 7/12 433/10 |
| 2011/0136071 | A1* | 6/2011 | Levens | A61C 7/125 433/13 |
| 2012/0028207 | A1* | 2/2012 | Cleary | A61C 7/00 433/10 |
| 2012/0288816 | A1* | 11/2012 | Dupray | A61C 7/143 433/10 |
| 2015/0216641 | A1* | 8/2015 | Popa-Simil | A61C 19/04 433/8 |
| 2016/0256241 | A1* | 9/2016 | Wigal | A61C 7/125 |
| 2017/0035532 | A1* | 2/2017 | Nguyen | A61C 7/125 |
| 2017/0086944 | A1* | 3/2017 | Hulwi | A61C 7/125 |
| 2017/0333162 | A1* | 11/2017 | Von Mandach | A61C 7/02 |
| 2018/0153650 | A1* | 6/2018 | Erskine-Smith | A61C 7/28 |

\* cited by examiner

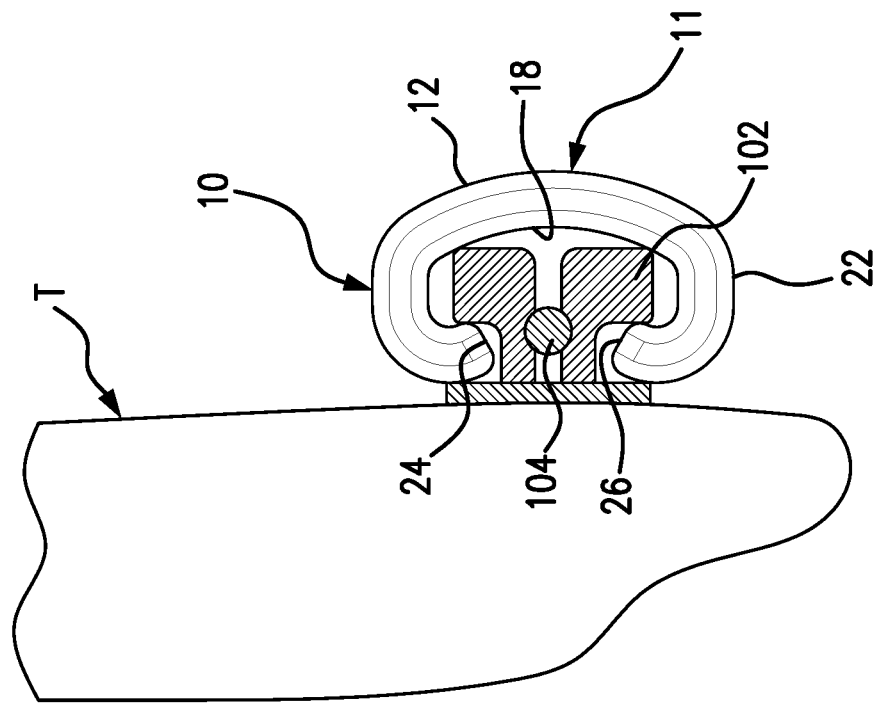
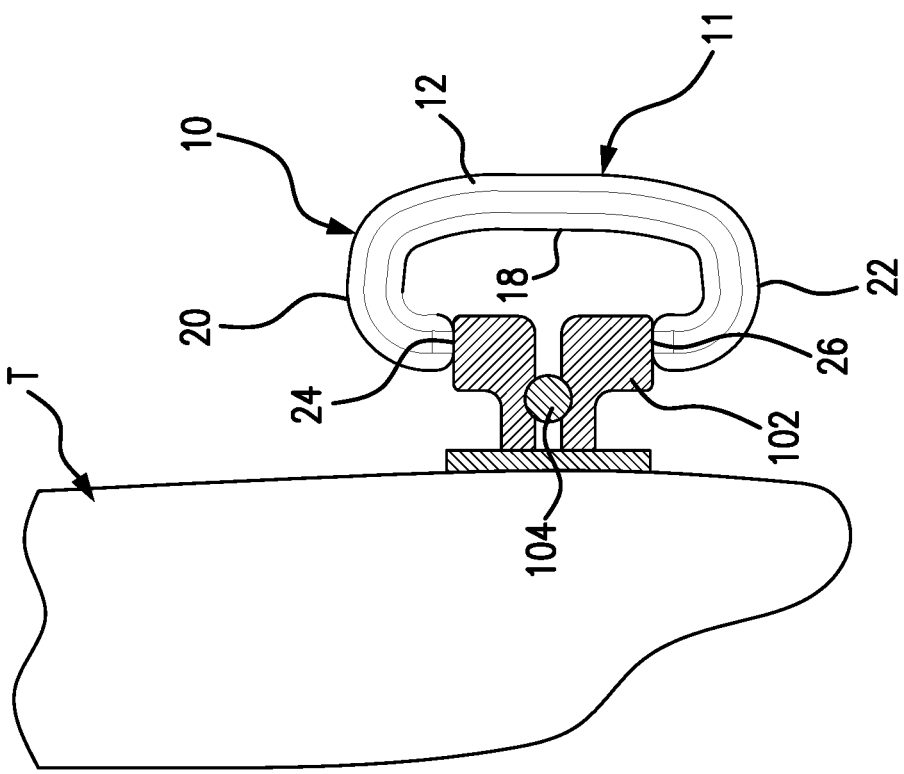

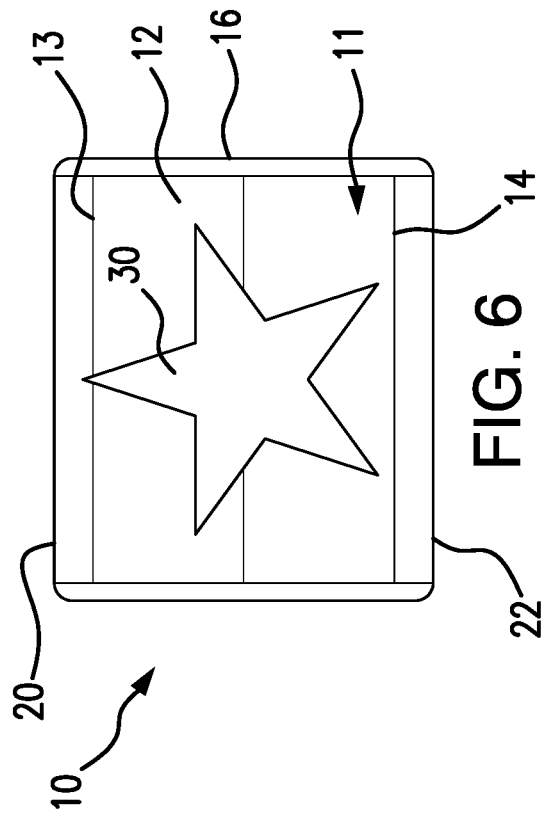
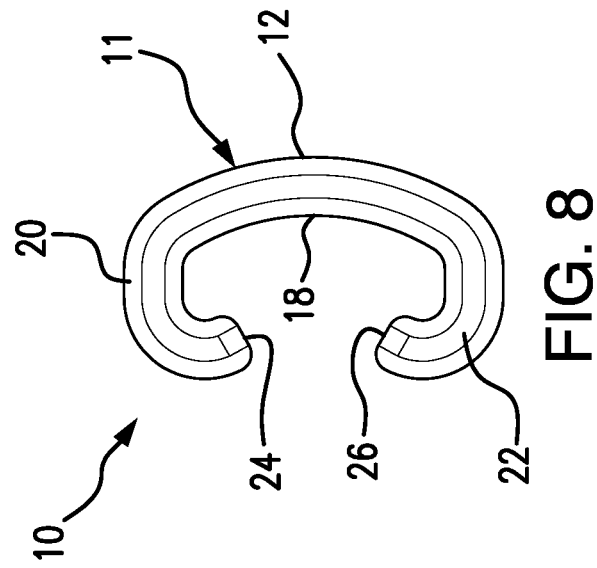
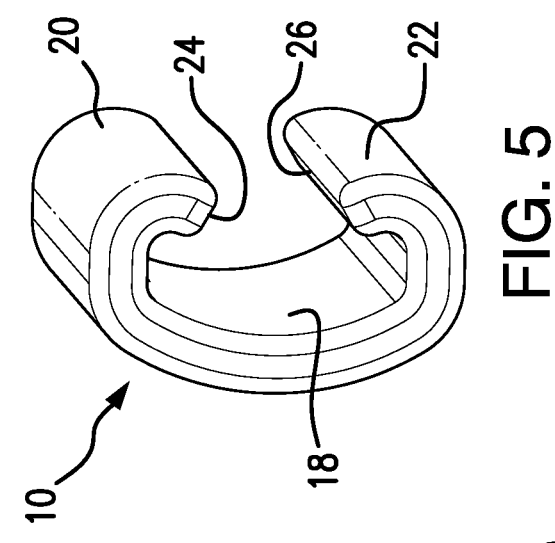
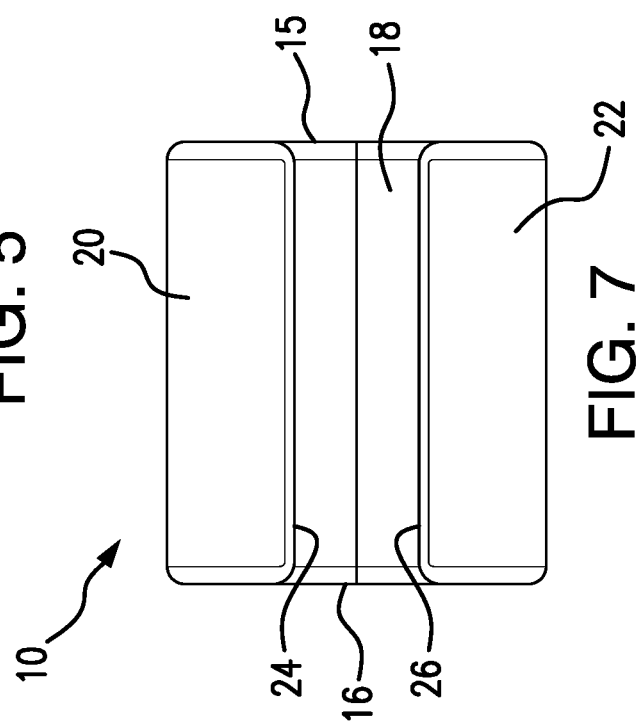

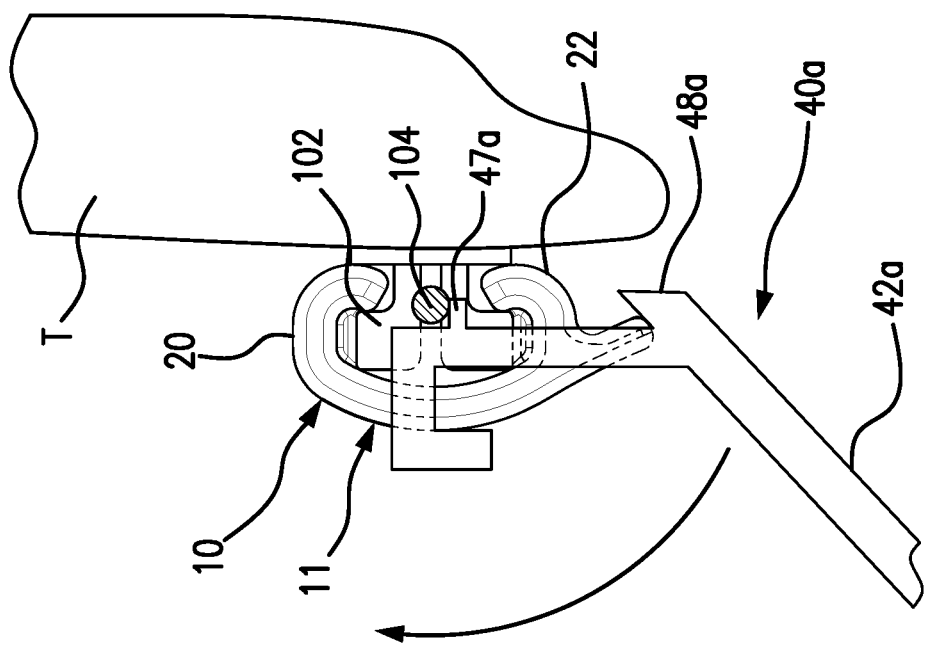
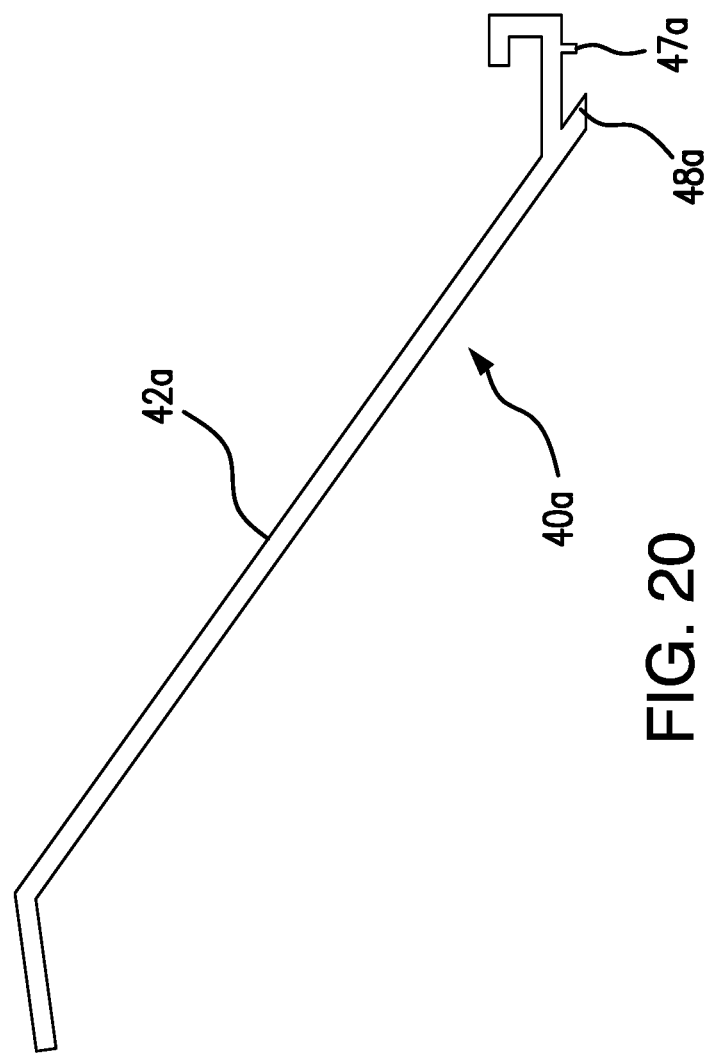

COVER FOR BRACKET OF ORTHODONTIC APPLIANCE

This non-provisional patent application is based on provisional patent application Ser. No. 62/512,922 filed May 31, 2017.

BACKGROUND OF THE INVENTION

Field of the Invention

This invention relates to accessory devices for orthodontic appliances and, more particularly, to a cover device for attachment to individual brackets on a patients teeth to provide an enhanced appearance of the orthodontic appliance without producing any tractive force on the arch wire. The invention may further include a tool that can be used by the patient to easily remove the cover device from the bracket.

Discussion of the Related Art

Orthodontic appliances commonly referred to as "dental braces" typically include brackets that are cemented to the outer facing surface of the patient's teeth and an arch wire that is held by the brackets and tightened to provide desired forces for aligning and straightening the patient's teeth. Traditional dental braces use elastic ties (o-ring ligators) that are stretched over and fitted onto the brackets for exerting a continually acting tractive force that urges the arch wire inwardly against the brackets and teeth.

While dental braces are highly effective and still one of the most commonly used orthodontic appliance for straightening and aligning teeth, they are generally unattractive. In particular, many orthodontic patients find the brackets on the exposed face of the teeth to be unappealing and they may even feel embarrassed and reluctant to smile. In an effort to enhance the overall appearance of dental braces, various elastomeric ligation devices have been proposed in the past. Some of these elastomeric ligators include a membrane or outer skin that covers and conceals the bracket from view when the ligator is attached over the bracket. Examples of these types of elastomeric ligators are found in U.S. Pat. No. 3,758,947 to Kissling and U.S. Pat. No. 7,204,691 to Darling et al. These elastomeric ligator devices and other ligation devices that have been proposed in the past exert pressure on the arch wire in order to secure the arch wire to the bracket. The law in most states requires that the operation of securing or unsecuring by attaching or removing a fastening device must be done under a minimum of indirect supervision by a licensed dentist, whereby the licensed dentist must examine the patient, diagnose a condition to be treated, authorize the procedure to be performed and be on the premises while the procedure is being performed by a dental assistant. Accordingly, while the various elastomeric ligation devices proposed in the past have been effective to conceal the generally unsightly bracket of orthodontic appliances, they are not suited to be attached or removed by the patient. Thus, the patient is not able to remove these elastomeric ligation devices each night or when desired, such as when brushing the teeth or simply to remove or interchange different cover devices over the brackets.

Accordingly, there still remains a need in the field of orthodontics, for a cover device that can be easily attached and removed over a brace of a dental appliance by the patient, as desired, without the need of supervision by a licensed dentist and/or the involvement of a dental assistant.

SUMMARY OF THE INVENTION

The present invention is directed to a cover device for attachment over a bracket of an orthodontic appliance and a tool for removing the cover device from the bracket. The cover device is formed of a plastic composition or similar material and is specifically sized, structured and configured to be attached over a single bracket, while engaging the undercut of the bracket in order to hold the cover device thereon. The cover device includes a main plate with an outer front face, and top and bottom claws that are integrally formed with the main plate. The top and bottom claws curl behind the main plate and terminate at distal ends in spaced, opposing relation to one another, and also spaced from the rear side of the main plate. The main plate is bowed outwardly from top to bottom so that the front face is convex and the rear side is concave. The bowed shape of the main plate, when in a relaxed state, allows the claws to flex away from one another and snap over the bracket upon application of inward pressure on the front face with the claws pressed against the bracket. This allows for snap-fit attachment of the cover device over the bracket with the distal ends of the top and bottom claws positioned in frictional engagement with an undercut on the back side of the bracket to discourage movement of the cover device relative to the bracket once attached thereto. When the cover device is attached to the bracket, the bracket is concealed from normal view. Orthodontic wax and/or silicon may be placed within the rear side of the cover device to promote attachment of the cover device on the bracket.

In another embodiment, the cover device includes a tab extending downwardly from a bottom of the cover device to facilitate patient removal with use of various embodiments of a removal tool. The tool includes a lifting member that is positioned under the tab of the cover device to exert an outward prying force on the back of the tab, thereby lifting the cover device off of the bracket.

The front face of the cover device may include any of various designs, shapes, symbols, team logos, etc. for enhancing the ornamental appearance of the cover device, while also allowing for the individualized expression of each patient. The cover device may also be provided in various colors to accommodate the desires of the patient. For instance, patients may choose colors according to holidays such as, for example, black and orange for Halloween or red white and blue for Independence Day. Patients may also choose colors based on school colors or the colors of the patients favorite sports team. Moreover, the front face of the cover device may serve as a base for any number of 3-dimensional designs.

OBJECTS AND ADVANTAGES OF THE INVENTION

Considering the forgoing, it is a primary object of the present invention to provide a cover device that is structured and disposed to be attached over a bracket of a dental appliance to conceal the bracket from view and enhance the appearance of the dental appliance.

It is a further object of the present invention to provide a cover device for removable attachment over the bracket of a dental appliance, and wherein the cover device does not attempt to secure or unsecure the arch wire of the orthodontic appliance from the bracket.

It is still a further object of the present invention to provide a cover device for removable attachment over a bracket of an orthodontic appliance to conceal the bracket from view, and wherein the cover device can be attached to the bracket and removed from the bracket by the patient without the need of a dental assistant and/or supervision of a licensed dentist.

It is yet a further object of the present invention to provide a cover device that is specifically designed, structured and disposed for removable attachment over the bracket of a dental appliance by the patient, and wherein the patient can easily remove the cover device from the bracket by simply sliding the cover device laterally to either side of the bracket, with the use of slight force of the fingers, until the top and bottom claws of the cover device clear the prongs of the bracket.

It is still a further object of the present invention to provide a cover device that is specifically designed, structured and disposed for removable attachment over the bracket of a dental appliance by the patient, and wherein the patient can easily remove the cover device from the bracket with the use of a specially designed tool when desired, and thereby providing for improved oral hygiene whereby the patient can remove multiple cover devices from brackets on multiple teeth in order to clean underneath the brackets.

It is still a further object of the present invention to provide a cover device for removable attachment over a bracket of an orthodontic appliance, and wherein the cover device helps to minimize abrasion of the inside tissue of the lips and cheeks within the patients mouth.

It is still a further object of the present invention to provide a cover device for removable attachment over a bracket of an orthodontic appliance, and wherein the cover device may include various designs, shapes, symbols, team logos, etc. on an exposed front face that is clearly visible when the patient smiles.

It is still a further object of the present invention to provide a cover device for removable attachment over a bracket of an orthodontic appliance, and wherein the cover device may be provided in a variety of colors to accommodate the needs, desires and personal taste of each patient.

These and other objects and advantages of the present invention are more readily apparent with reference to the accompanying drawings.

BRIEF DESCRIPTION OF THE DRAWINGS

For a fuller understanding of the nature of the present invention, reference should be made to the following detailed description taken in conjunction with the accompanying drawings in which:

FIGS. 3A-3B illustrate a sequence of snap-fit attachment of the cover device of the present invention over a bracket of the orthodontic appliance;

FIG. 5 is a rear, side perspective view of the cover device of the present invention, according to one embodiment;

FIG. 6 is a front elevational view of the cover device of FIG. 5 showing a front face of the cover device with an ornamental design thereon;

FIG. 7 is a rear elevational view of the cover device of FIG. 5;

FIG. 8 is a left end elevational view of the cover device of FIG. 5;

FIG. 20 is a side elevational view of a second embodiment of a tool for use in removing the second embodiment of the cover device of the present invention from the bracket of the orthodontic appliance;

FIG. 21 is a side elevational view, shown in partial cross section, illustrating positioning of the tool of FIG. 20 in relation to the arch wire, bracket and cover device for removing the cover device from the bracket of the orthodontic appliance.

Like reference numerals refer to like parts throughout the several views of the drawings.

DETAILED DESCRIPTION OF THE PREFERRED EMBODIMENTS

Figure 1A:
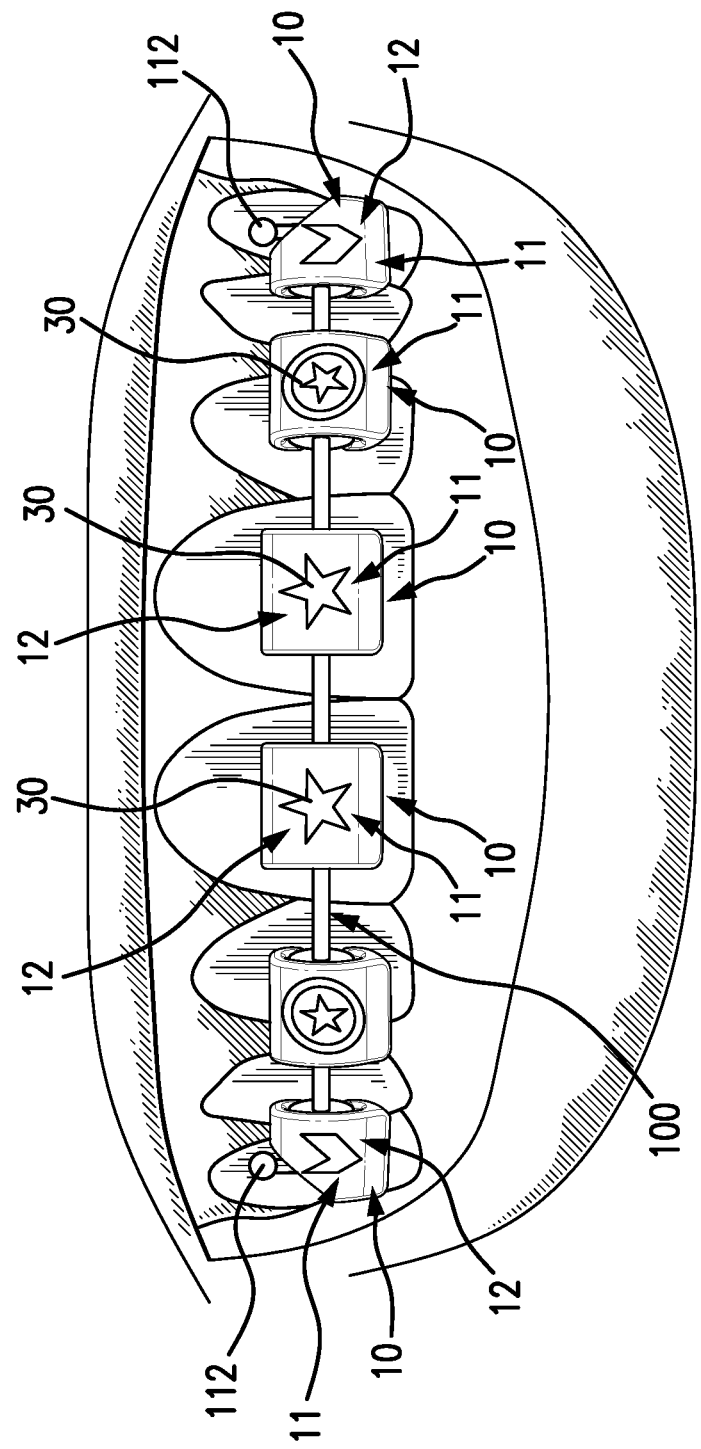
FIG. 1A is a front elevational view showing the cover devices of the present invention fitted over brackets of an orthodontic appliance on six front teeth of a patient including the four incisors and the two canines, in accordance with one embodiment of the invention.
Figure 1B:
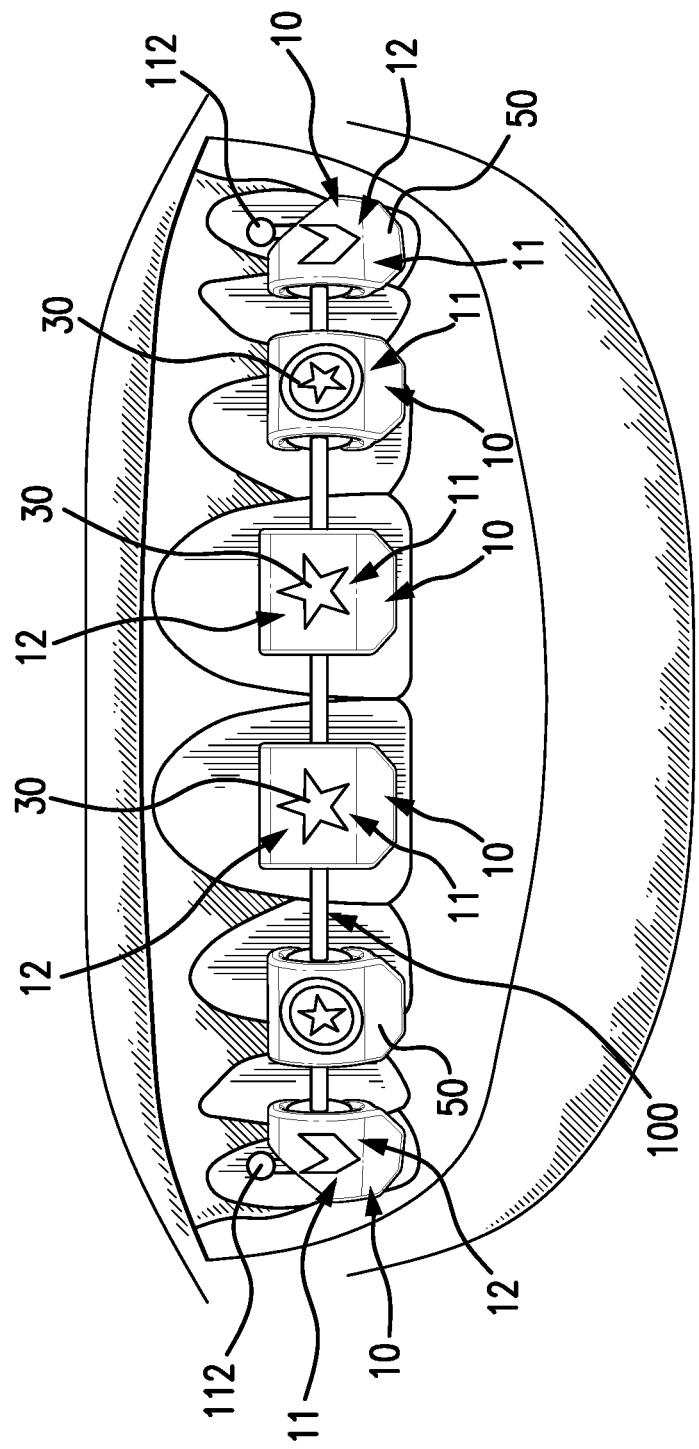
FIG. 1B is a front elevational view showing the cover devices of the present invention fitted over brackets of an orthodontic appliance on six front teeth of a patient including the four incisors and the two canines, in accordance with another embodiment of the invention.
Figure 2:
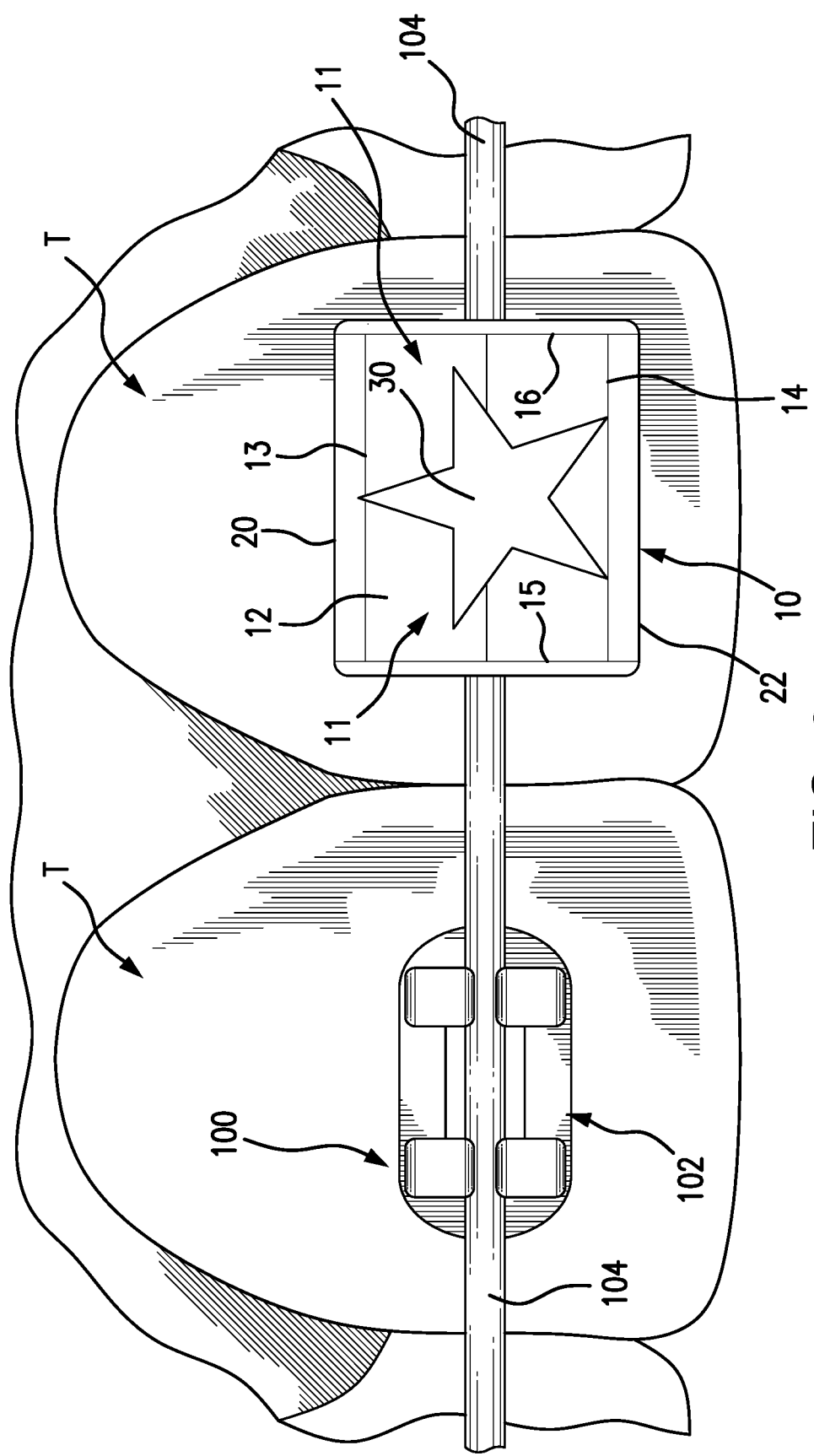
FIG. 2 is an isolated front elevational view showing two incisor teeth of the patient with the orthodontic appliance, including an arch wire and bracket, and further illustrating the cover device of the present invention attached over one of the brackets of the orthodontic appliance.

Referring initially to FIG. 1A, the cover device of the present invention is shown installed on brackets fixed to a patient's upper incisor teeth and canine teeth, according to a first embodiment of the invention. FIG. 1B illustrates a second embodiment of the cover devices installed on brackets fixed to a patient's upper incisor teeth and canine teeth. The cover device of the present invention is generally indicated as 10 throughout the several views of the drawings and is specifically structured for snap-fit attachment and removal from brackets 102 of an orthodontic appliance 100 having an arch wire 104 extending through the brackets 102, as seen in FIGS. 1 and 2. Each bracket 102 is bonded to a single tooth T of the patient.

Referring to FIGS. 2-8, the first embodiment of the cover device 10 of the present invention is shown and includes a main plate 11 having an outer front face 12, a top end 13, a bottom end 14, opposite side edges 15, 16 and a rear side 18. A top claw 20 is integrally formed with the main plate 11 and extends from the top end 13 of the main plate and curls back and downwardly behind the main plate, terminating at a distal end 24, as best seen in FIGS. 3A-3B and FIG. 8. A bottom claw 22 is integrally formed with the main plate 11 and extends from the bottom end 14 of the main plate 11 and curls back and upwardly behind the main plate 11, terminating at a distal end 26, so that the distal ends 24, 26 of the upper and lower claws are spaced in opposing relation to one another and spaced from the rear side 18 of the main plate 11, as seen in FIGS. 3A-3B and FIG. 8.

In a preferred embodiment, the cover device 10 is formed of a plastic composition or other similar composition that is generally rigid, but has memory. Thus, the molded material composition can be flexed to deform from a relaxed state upon application of an external force, but seeks to return back to the original relaxed state upon removal of the external force. It should be noted that when fitted to a bracket 102, the cover device 10 does not fully return to the relaxed state so the cover device 10 maintains frictional engagement with the bracket 102 under constant grasping tension, thereby avoiding undesirable movement of the cover device 10 relative to the bracket 102.

In a preferred embodiment, the main plate is bowed from the top end 13 to the bottom end 14 so that the outer face 12 is generally convex and the rear side 18 is generally concave. The bowed structure of the main plate 11 allows the main plate 10 to be deformed inwardly towards the distal ends 24, 26 of the claws 20, 22 upon application of an external force when the top and bottom claws 20, 22 are pressed against the bracket 102 of the orthodontic appliance 100. More specifically, referring to FIGS. 3A and 3B, a sequence of attachment of the cover device 10 is shown wherein the cover device 10 is positioned in front of the bracket and a force is applied to the outer front face 12 of the main plate 11 causing the main plate to flex and deform inwardly. This causes the top and bottom claws 20, 22 to flex away from one another so that the distal ends 24, 26 of the top and bottom claws move further apart from one another. This allows the top claw 20 and the bottom claw 22 to move over and around the bracket 102, as seen in FIG. 3A. Further inward movement of the cover device 10 relative to the bracket, eventually allows the distal ends 24, 26 of the top and bottom claws to close towards one another within an undercut on the back side of the bracket 102 in a snap-fit action. FIG. 3B shows the cover device 10 attached on the bracket 102. When the cover device 10 is attached to the bracket 102, the top claw 20 and the bottom claw 22 have not quite returned to the fully relaxed state, so that the top and bottom claws maintain pressure on the bracket 102, to create frictional engagement between the cover device 10 and the bracket 102. This helps to maintain the cover device 10 on the bracket 102, wherein one or more cover devices 10 on brackets 102 of the dental appliance remain securely attached without undesirable movement or easy dislodgement.

Figure 4:
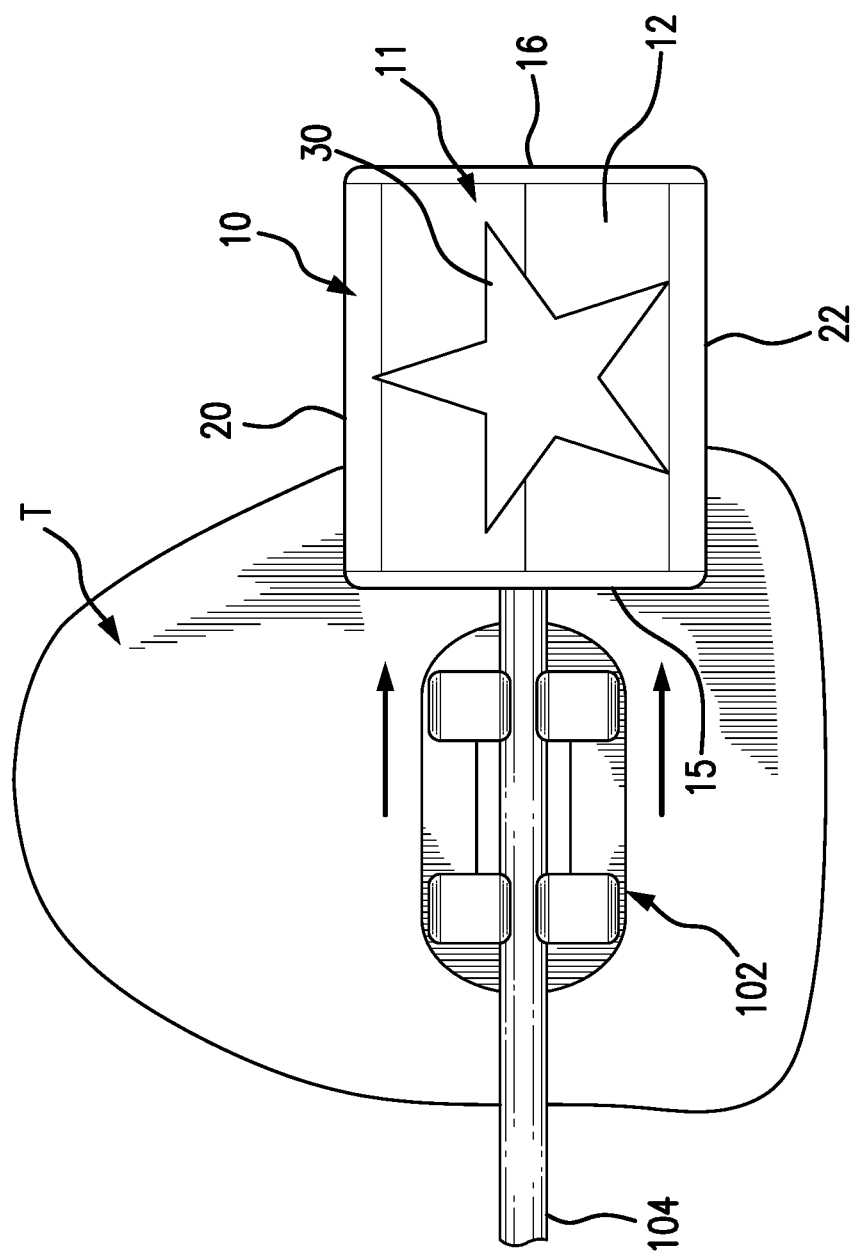
FIG. 4 is an isolated front elevational view of a single tooth illustrating lateral sliding removal of the cover device of the present invention from the bracket of the orthodontic appliance.
Figure 10:
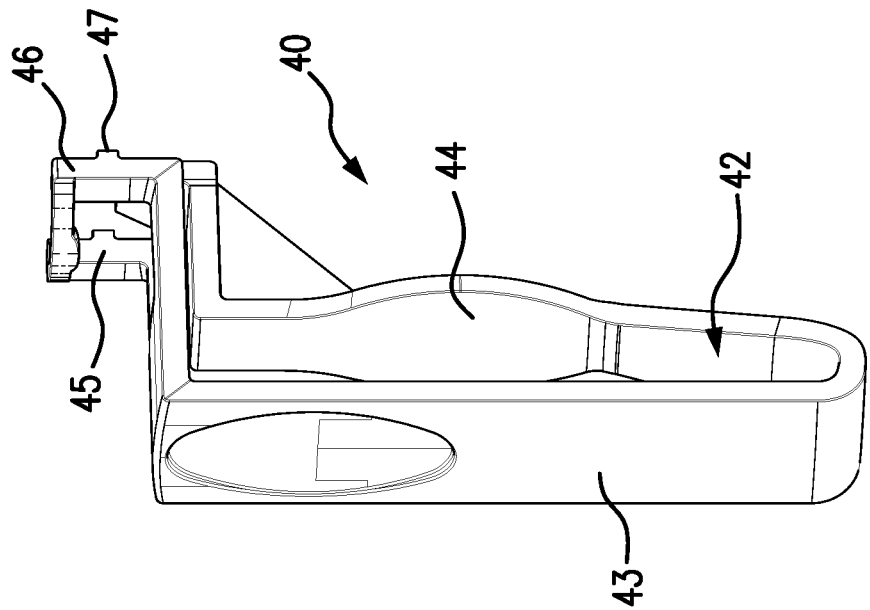
FIG. 10 is a front, side perspective view of the tool of FIG. 9.
Figure 9:
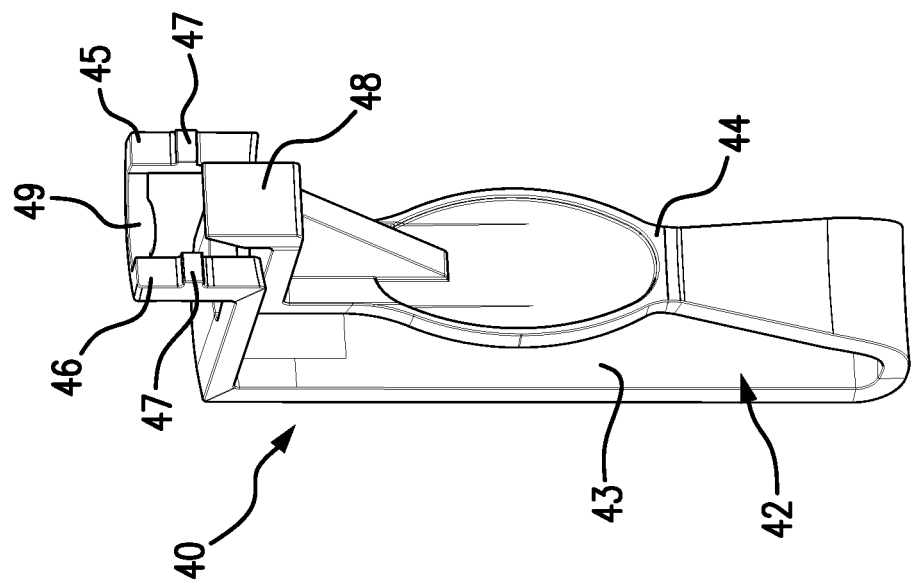
FIG. 9 is a rear perspective view of a tool for use in removing the cover device of the present invention in accordance with one embodiment thereof.

As seen in FIGS. 5 and 8, the opposite sides of the cover device 10 are open between the side edges 15, 16 of the main plate 12 and the top and bottom claws 20, 22. The open opposite sides of the cover device 10 are sized and configured to allow passage of the bracket 102 outwardly therethrough upon application of an external lateral force to the cover device 10 that is sufficient to overcome the force of frictional engagement of the top and bottom claws 20, 22 with the bracket 102 and slide the cover device 10 sideways off of the bracket 102, as illustrated in FIG. 4. Once the cover device 10 completely clears the bracket 102, as seen in FIG. 4, the cover device 10 can be simply pulled outwardly away from the arch wire 104 of the dental appliance and removed from the patient's mouth. Because the distance between brackets 102 on adjacent teeth T is greater than the width of the cover device 10, there is ample space between brackets to allow removal of the cover device 10 off of the orthodontic appliance 100, once the cover device 10 has been slid laterally off of the bracket and positioned between brackets on adjacent teeth.

As seen in FIGS. 1, 4 and 6, the front face 12 of the cover device 10 may be provided with an ornamental design, symbol, shape, team logo, or other indicia, 30 as desired by the user/patient.

A further embodiment of the cover device 10 is shown in FIGS. 11-19. In particular, a further embodiment of the cover device 10 includes a tab 50 extending downwardly from the bottom end 14 of the main plate 11. The downwardly depending tab 50 is specifically structured and disposed for cooperating engagement with a tool for removing the cover device 10 from the bracket 102. FIGS. 9-13 illustrate one embodiment of a removal tool that engages the downwardly depending tab 50 on the cover device 10 for applying a prying force that separates the cover device 10 from the bracket 102. Specifically, the first embodiment of the removal tool is shown in FIGS. 9-13 and is generally indicated as 40. The tool 40 includes a handle portion 42 formed by two spaced apart, generally L-shaped members 43 and 44. A top end of L-shaped member 43 includes upwardly extending and spaced apart parallel arms 45 and 46 that are joined together by an arch member 49 to discourage separation or relative movement of the parallel arms 45, 46. A top end of the other L-shaped member 44 is provided with an upwardly extending lifting member 48.

Figure 11:
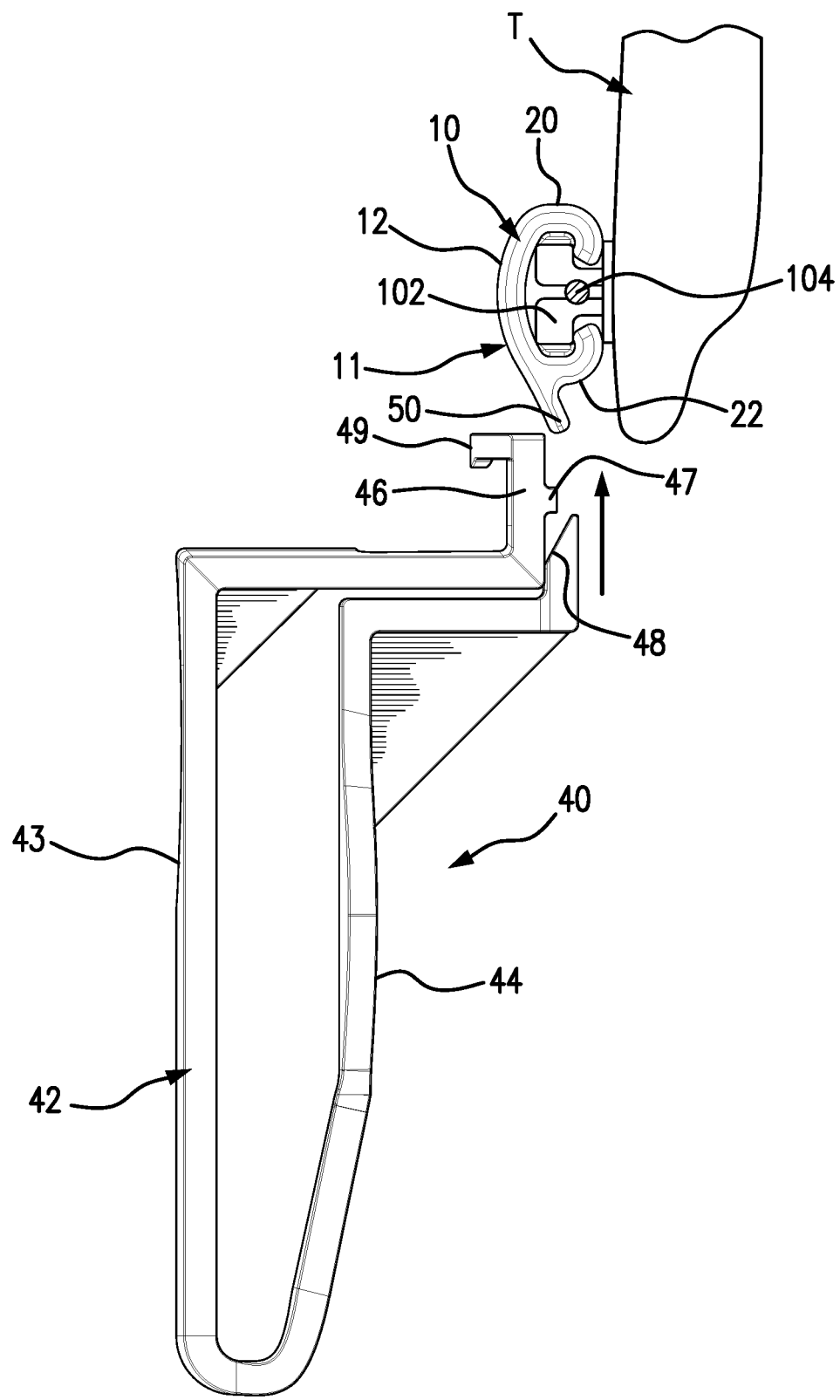
FIG. 11 is a side elevational view, shown in partial cross section, illustrating movement of the tool of FIGS. 9-10 into position for removing the cover device from the bracket of the orthodontic appliance, in accordance with a second embodiment of the cover device of the present invention.
Figure 12:
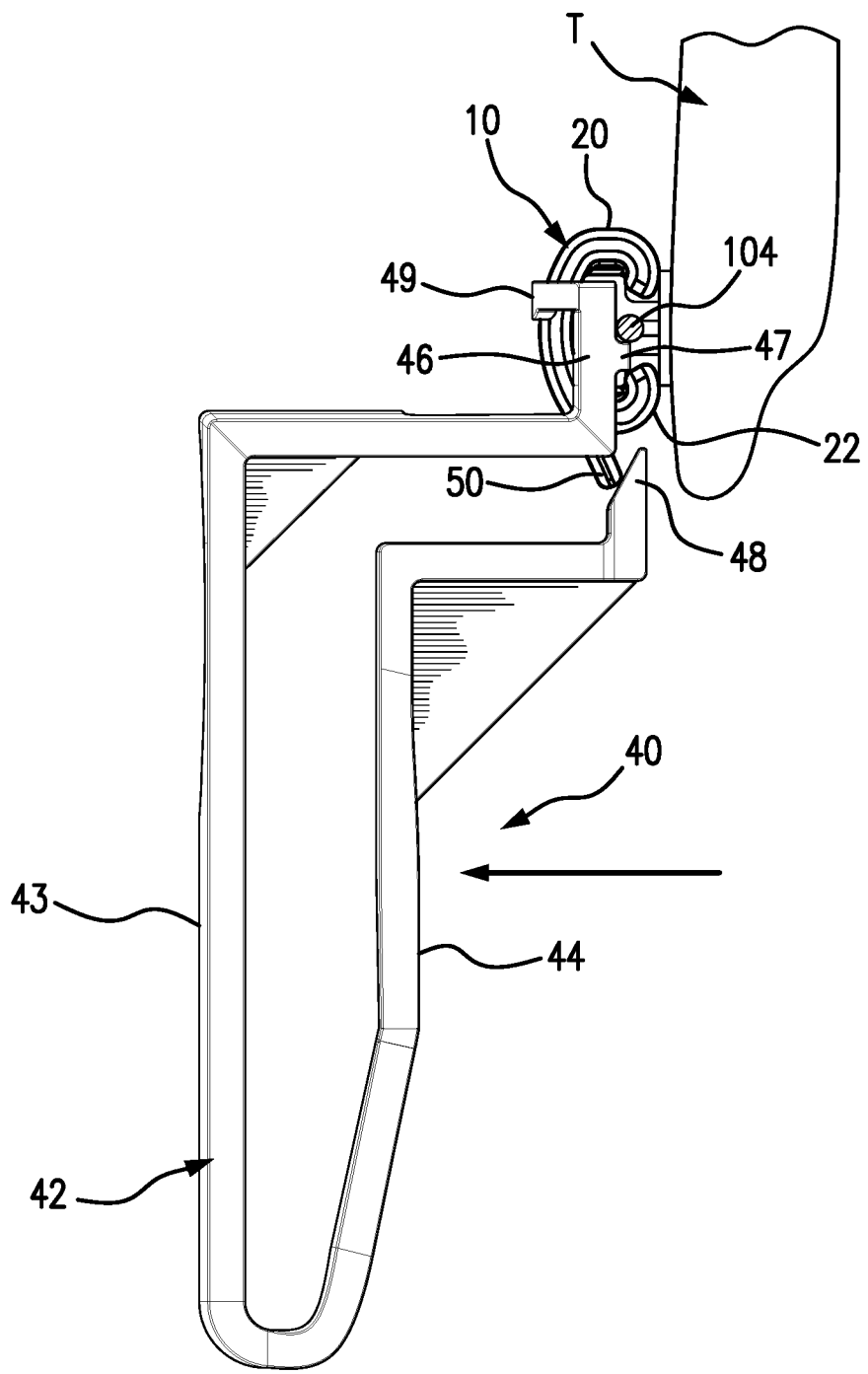
FIG. 12 is a side elevational view, shown in partial cross section, showing the tool of FIGS. 9-10 in position for removing the cover device from the bracket of the orthodontic appliance.
Figure 13:
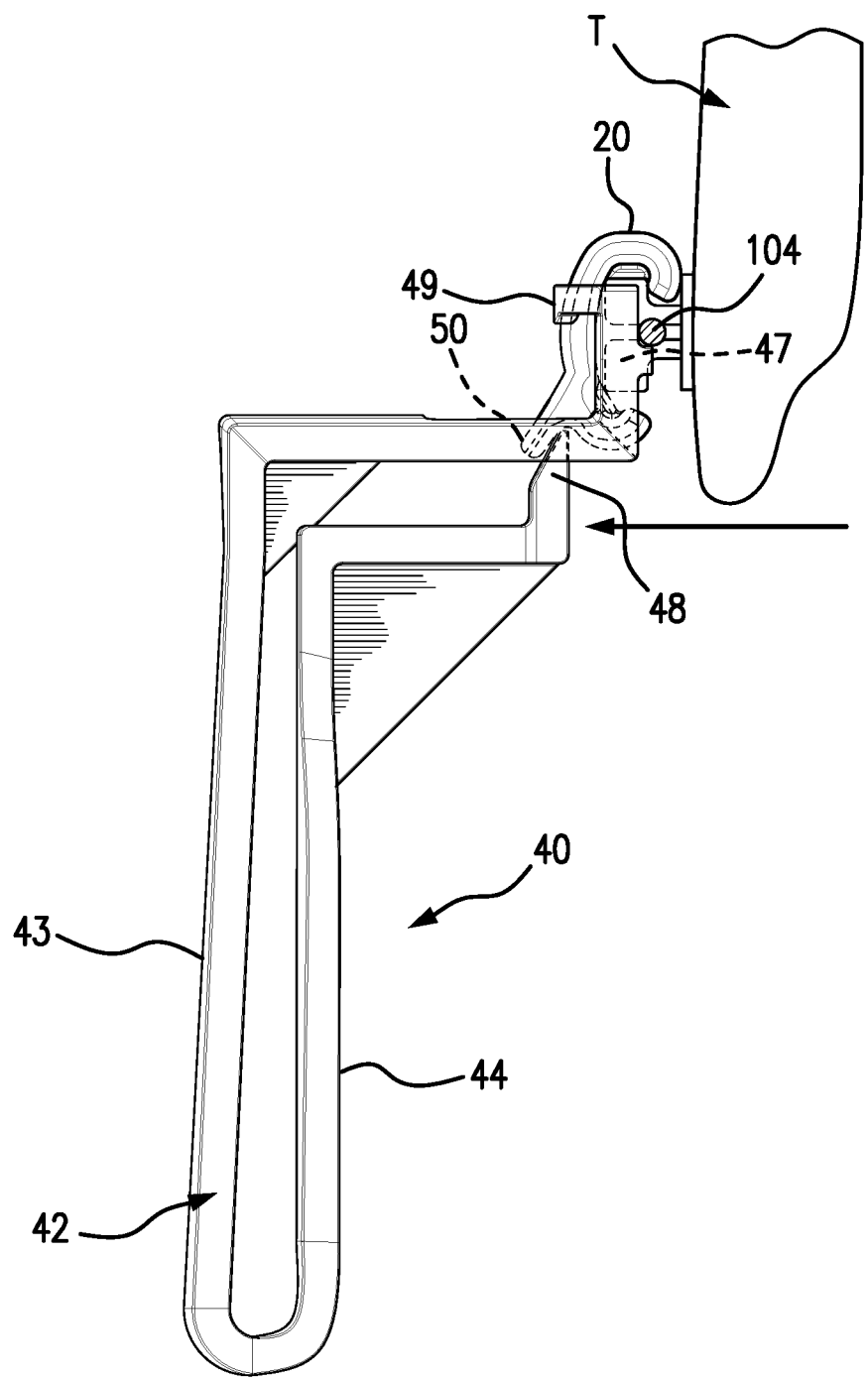
FIG. 13 is a side elevational view, in partial cross section, illustrating operation of the tool to engage a tab extending from the bottom of the cover device in accordance with the second embodiment of the cover device of the present invention, for prying the cover device off of the bracket of the orthodontic appliance.

Referring to FIGS. 11-13, a sequence of operational use of the tool 40 to remove the cover device 10 from the bracket 102 is illustrated. Specifically, to remove the cover device 10, the spaced apart parallel arms 45, 46 are positioned below and slightly in front of the downwardly depending tab 50 of the cover device and the tool 40 is then moved upwardly so that the top ends of the parallel arms 45, 46 are positioned in front of the arch wire, on opposite sides of the cover device 10. With the upper ends of the parallel arms 45, 46 engaged against the outer side of the arch wire, on opposite sides of the bracket 102, the tool 40 is moved upwardly so that the tapered end of the lifting member 48 is positioned under the tab 50 of the cover device 10. Stop elements 47 on the parallel arms 45, 46 engage the underside of the arch wire 104 to prevent over insertion of the lifting member 48, so that only the tab 50 is engaged by the lifting member 48 and not the undercut of the bracket 102 or the bottom claw 22 of the cover device. With the fingers engaged with the outer side of L-shaped member 43 and the thumb engaged with a thumb plate on L-shaped number 44, a squeezing force is applied, causing the lifting member 48 to move against the back side of the tab 50 and outwardly away from the bracket 102, causing the bottom claw 22 to be pried off of the bracket 102, as seen in FIG. 13. This effectively separates the cover device 10 from the bracket 102 so that it can be easily removed from the patient's mouth. It should be noted that this operation of use of the tool 40 can easily be performed by the patient without any assistance.

Figure 14:
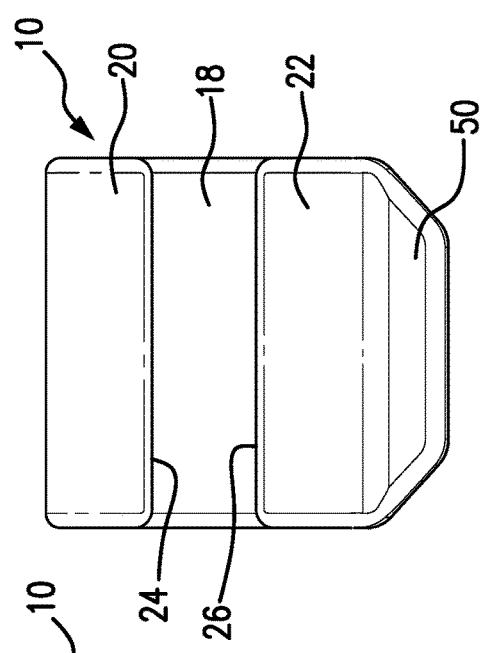
FIG. 14 is a side rear perspective view of the cover device of the present invention in accordance with the second embodiment thereof.
Figure 15:
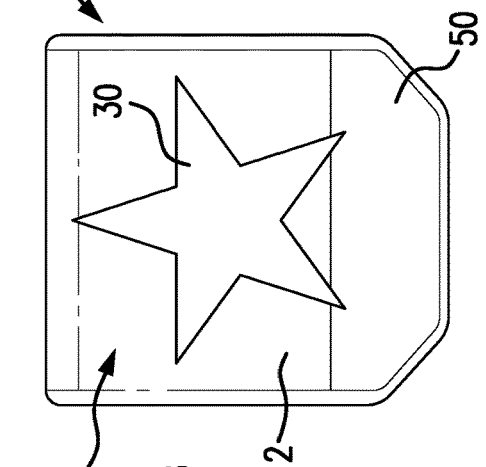
FIG. 15 is a front elevational view showing a front exposed face of the cover device of FIG. 14, with an ornamental design thereon.
Figure 17:
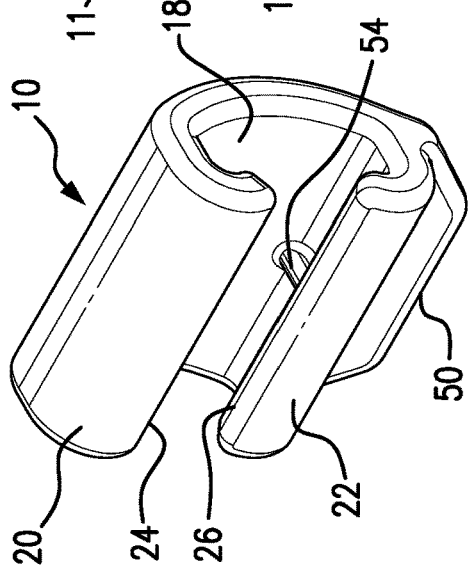
FIG. 17 is a side elevational view of the cover device of FIG. 14.
Figure 16:
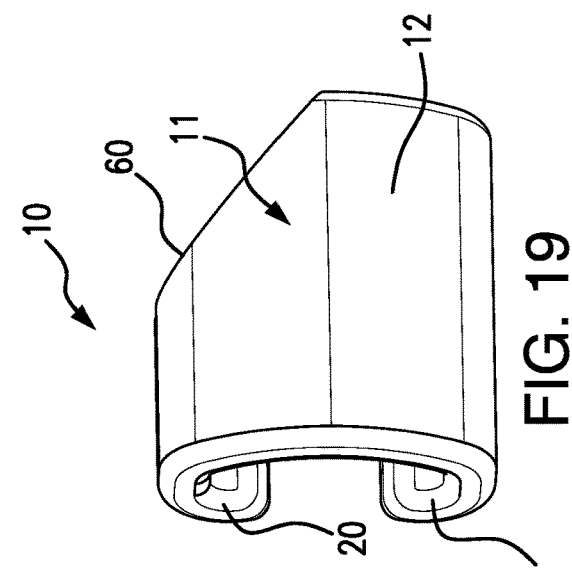
FIG. 16 is a rear elevational view of the cover device of FIG. 14.

Referring to FIGS. 14 and 17, the second embodiment of the cover device 10 includes at least one stop member centrally positioned on the rear side for discouraging lateral movement of the cover device 10 relative to the bracket 102. As seen in FIG. 17, a centrally positioned rib 54 extends from the rear side 18 of the main plate 12 to an inner side of both the top claw 20 and the bottom claw 22 to provide stop members 54. These two centrally positioned stop members 54 (i.e., upper and lower) are positioned between left and right prong sets of the bracket 102 (see FIG. 2) so that lateral movement of the cover device 10 relative to the bracket 102 will cause the stop members 54 to engage the prong sets of the bracket 102. This helps to prevent unwanted lateral movement and possible separation of the cover device 10 from the bracket 102. It should be noted, however, that with sufficient lateral force, the stop members 54 may ride over the prong sets of the bracket 102 and thereby allow for separation and removal of the cover device 10 from the bracket 102.

Figure 18:
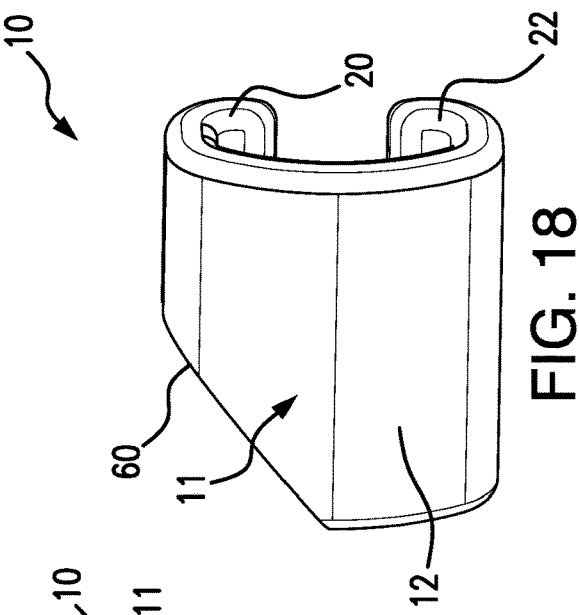
FIG. 18 is a front perspective view of a further embodiment of the cover device of the present invention that is specially designed for attachment to a bracket of the orthodontic appliance that contains a fixed hook.
Figure 19:
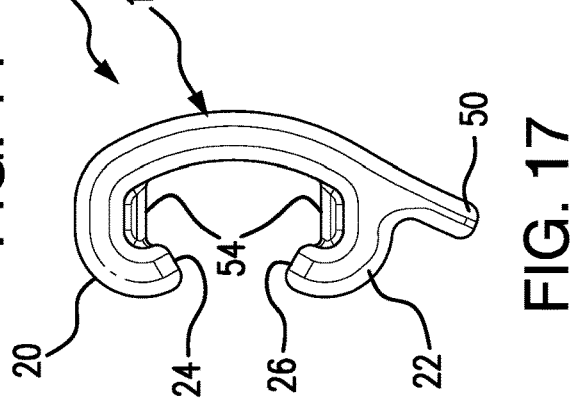
FIG. 19 is a front perspective view of the third embodiment of the cover device of the present invention that is specially designed for attachment to a bracket of the orthodontic appliance on the opposite tooth of the patient where the bracket contains a fixed hook.

As seen in FIGS. 1, 18 and 19, the cover device 10 is modified to accommodate a hook 112 on the dental appliance 100 that is normally positioned at the canine teeth. Specifically, to accommodate sufficient room for the hook 112 of the orthodontic appliance, a portion of the top corner of the main plate 11 is removed, providing for an angled edge 60 extending from the main plate to the top claw 20 behind the main plate. As see in FIGS. 1, 18 and 19, one of the cover devices is made for the left canine tooth and the other cover device is made for the right canine tooth so that the two cover devices, as seen in FIGS. 18 and 19, are essentially mirror images of one another.

A second embodiment of the removal tool is shown in FIGS. 20 and 21 and is generally indicated as 40a. The removal tool 40a has no moving parts and includes a lever 42a that extends to a working head that engages the arch wire 104 and the tab 50 of the cover device 10. Specifically, the stop member 47a is positioned against the underside of the arch wire 104 to properly position the lifting member 48a behind the tab 50 of the cover device. In this position, as shown in FIG. 21, the lever 42a of the tool is rotated upwardly, as indicated by the arrow in FIG. 21, to effectively apply a prying force to the tab 50 that removes the bottom claw 22 from the bracket 102, effectively allowing separation and removal of the cover device 10 from the patient's mouth. Again, the tool 40a is easily used by the patient, without assistance, to remove the cover device 10 from the bracket 102 of the orthodontic appliance 100.

Figure 22:
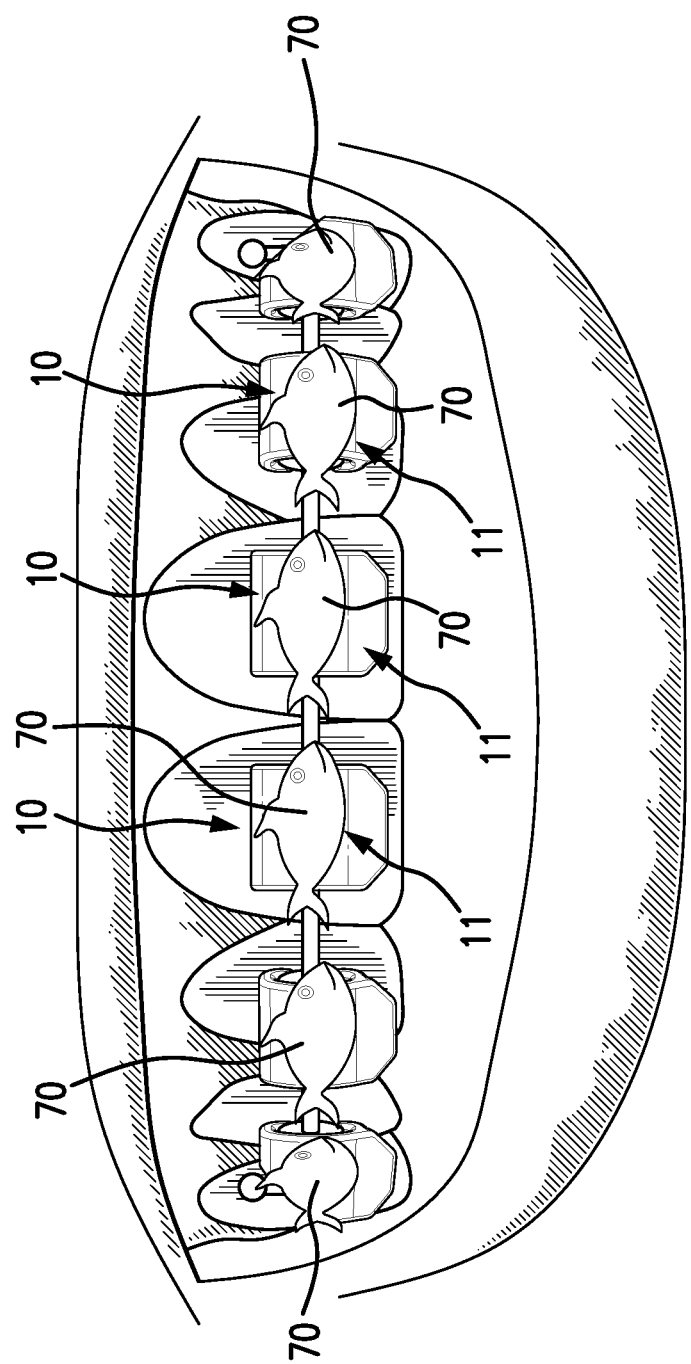
FIG. 22 is a front elevational view showing the cover devices fitted over brackets of an orthodontic appliance on six front teeth of a patient according to a further embodiment of the present invention wherein a 3-dimensional design is applied to the outer faces of the cover devices.

Referring to FIG. 22, a further embodiment of the invention contemplates a 3-dimensional design 70 on the outer face 12 of the base plate 11 of the cover device to provide for an enhanced ornamental appearance. In this particular example, the 3-dimensional design 70 is shown as a fish, with a series of the cover devices attached to adjacent brackets on the patient's upper incisor teeth and canines presenting the appearance of fish swimming in a line, one behind the other. It should be noted that virtually any 3-dimensional shape is contemplated within the spirit and scope of the invention.

While the present invention has been shown and described in accordance with several preferred and practical embodiments, it is recognized that departures from the instant disclosure are fully contemplated within the spirit and scope of the following claims as interpreted under the Doctrine of Equivalents.

What is claimed is:

1. A cover device for attachment to a bracket that is fixed to a patient's tooth in an orthodontic appliance that has an arch wire extending through the bracket, said cover device comprising:
   a main plate having an outer front face, a top end, a bottom end, opposite side edges and a rear side;
   a top claw integrally formed with the main plate and extending from the top end of the main plate and curling behind the main plate, and a bottom claw integrally formed with the main plate and extending from the bottom end of the main plate and curling behind the main plate, and the top and bottom claws both terminating at distal ends that are positioned in spaced, opposing relation to one another and spaced from the rear side of the main plate;
   at least one vertically oriented stop member centrally positioned on the rear side of the main plate for discouraging unintended lateral movement of the cover device relative to the bracket, and the at least one stop member being structured and configured to yield to externally applied lateral forces to allow lateral sliding movement of the cover device and removal of the cover device from the bracket; and
   the main plate being bowed outwardly from the top end to the bottom end when in a relaxed state, and the main plate being adapted to deform inwardly upon application of an external inward force to the front face with the top and bottom claws engaged against a front side of the bracket to cause the top and bottom claws to flex away from one another and snap over the bracket and into frictional engagement with the bracket, to thereby attach the cover device to the bracket, and the cover device being structured and configured to avoid contact with the arch wire of the orthodontic appliance when the cover device is attached to the bracket and the main plate is in the relaxed state, and the cover device thereby not functioning to connect the arch wire to the bracket.

2. The cover device as recited in claim 1 wherein the cover device is open at opposite sides between the opposite side edges and the top and bottom claws.

3. The cover device as recited in claim 2 wherein the open opposite sides of the cover device are sized and configured to allow passage of the bracket outwardly therethrough upon application of an external lateral force to the cover device that is sufficient to overcome the at least one stop member and a force of frictional engagement of the top and bottom claws with the bracket, to thereby slide the cover device sideways and off of the bracket.

4. The cover device as recited in claim 1 wherein the cover device includes a tab extending downwardly from the bottom end of the main plate for cooperating engagement with a tool for removing the cover device from the bracket.

5. The cover device as recited in claim 4 wherein the tool includes a lifting member that is structured and disposed for exerting an outward prying force to a back side of the tab for removing the cover device from the bracket.

6. The cover device as recited in claim 1 further comprising an angled edge extending from one of the side edges of the main plate to the top claw to provide clearance for a hook on the orthodontic appliance.

7. The cover device as recited in claim 1 wherein the front face of the main plate includes a design thereon.

8. The cover device as recited in claim 1 wherein the front face of the main plate includes a 3-dimensional design thereon.

9. A cover device for attachment to a bracket that is fixed to a patient's tooth in an orthodontic appliance that has an arch wire extending through the bracket, said cover device comprising:
   a main plate having an outer front face, a top end, a bottom end, opposite side edges and a rear side;
   a top claw integrally formed with the main plate and extending from the top end of the main plate and curling behind the main plate, and a bottom claw integrally formed with the main plate and extending from the bottom end of the main plate and curling behind the main plate, and the top and bottom claws both terminating at distal ends that are positioned in spaced, opposing relation to one another and spaced from the rear side of the main plate;
   at least one vertically oriented stop member centrally positioned on the rear side of the main plate for discouraging unintended lateral movement of the cover device relative to the bracket, and the at least one stop member being structured and configured to yield to externally applied lateral forces to allow lateral sliding movement of the cover device and removal of the cover device from the bracket; and
   the top and bottom claws being structured and disposed for snap-fit attachment over the bracket and into frictional engagement with the bracket to thereby attach the cover device to the bracket, and the cover device being structured and configured to avoid contact with the arch wire of the orthodontic appliance when the cover device is attached to the bracket and the main plate is in the relaxed state, and the cover device thereby not functioning to connect the arch wire to the bracket.

10. The cover device as recited in claim 9 wherein the cover device is open at opposite sides between the opposite side edges and the top and bottom claws.

11. The cover device as recited in claim 10 wherein the open opposite sides of the cover device are sized and configured to allow passage of the bracket outwardly therethrough upon application of an external lateral force to the cover device that is sufficient to overcome the at least one stop member and a force of frictional engagement of the top and bottom claws with the bracket, to thereby slide the cover device sideways and off of the bracket.

12. The cover device as recited in claim 9 wherein the cover device includes a tab extending downwardly from the bottom end of the main plate for cooperating engagement with a tool for removing the cover device from the bracket.

13. The cover device as recited in claim 12 wherein the tool includes a lifting member that is structured and disposed for exerting an outward prying force to a back side of the tab for removing the cover device from the bracket.

14. The cover device as recited in claim 9 further comprising an angled edge extending from one of the side edges of the main plate to the top claw to provide clearance for a hook on the orthodontic appliance.

15. The cover device as recited in claim 9 wherein the front face of the main plate includes a design thereon.

16. The cover device as recited in claim 9 wherein the front face of the main plate includes a 3-dimensional design thereon.

* * * * *